(12) United States Patent
Kishiyama et al.

(10) Patent No.: US 8,483,170 B2
(45) Date of Patent: Jul. 9, 2013

(54) USER EQUIPMENT TERMINAL, BASE STATION, AND CHANNEL QUALITY INFORMATION REPORT METHOD

(75) Inventors: Yoshihisa Kishiyama, Yokosuka (JP); Kenichi Higuchi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 453 days.

(21) Appl. No.: 12/672,523

(22) PCT Filed: Aug. 13, 2008

(86) PCT No.: PCT/JP2008/064539
§ 371 (c)(1),
(2), (4) Date: May 6, 2010

(87) PCT Pub. No.: WO2009/022705
PCT Pub. Date: Feb. 19, 2009

(65) Prior Publication Data
US 2012/0002556 A1    Jan. 5, 2012

(30) Foreign Application Priority Data
Aug. 14, 2007 (JP) ................................. 2007-211597

(51) Int. Cl.
*H04W 4/00* (2009.01)
*G08C 25/02* (2006.01)

(52) U.S. Cl.
USPC .......................................... 370/330; 714/748

(58) Field of Classification Search
USPC ............................ 370/328–330, 335; 714/748
See application file for complete search history.

(56) References Cited

U.S. PATENT DOCUMENTS

2006/0274712 A1* 12/2006 Malladi et al. ................. 370/345
2008/0207135 A1*  8/2008 Varadarajan et al. ........... 455/69
2009/0130986 A1*  5/2009 Yun et al. .................... 455/67.11

FOREIGN PATENT DOCUMENTS

JP    2007-166118 A    6/2007

OTHER PUBLICATIONS

3GPP TS 25.214 V7.5.0, May 2007, "Physical layer procedures (FDD)," 84 pages.
International Search Report w/translation from PCT/JP2008/064539 dated Nov. 11, 2008 (6 pages).
Written Opinion from PCT/JP2008/064539 dated Nov. 11, 2008 (4 pages).
3GPP TSG RAN WG1 Meeting #47, R1-063204; "Compressed CQI Reporting Scheme"; NEC Group; Riga, Latvia; Nov. 6-10, 2006 (8 pages).
3GPP TSG RAN WG1 Meeting #49bis, R1-073093; "PUCCH Transmission without Data in E-UTRA"; Samsung; Orlando, Florida USA; Jun. 25-29, 2007 (5 pages).
3GPP TS 25.214 V7.3.0; "Physical layer procedures (FDD)"; Dec. 2006 (60 pages).

* cited by examiner

*Primary Examiner* — Paul H Masur
(74) *Attorney, Agent, or Firm* — Osha Liang LLP

(57) ABSTRACT

A user equipment terminal for reporting channel quality information to a base station includes a channel quality information measuring unit configured to measure channel quality information; and a channel quality information generating unit configured to generate, as the channel quality information, a difference value between a first absolute value of the measured channel quality information and a second absolute value of previously measured channel quality information. The present invention also relates to a base station and a channel quality information report method.

10 Claims, 20 Drawing Sheets

FIG.12
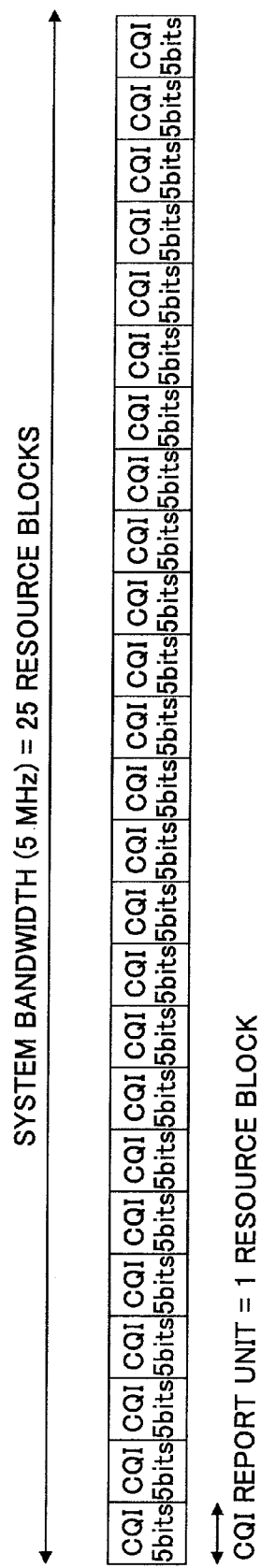
(a) HIGH FREQUENCY RESOLUTION
CQI REPORT UNIT = 1 RESOURCE BLOCK
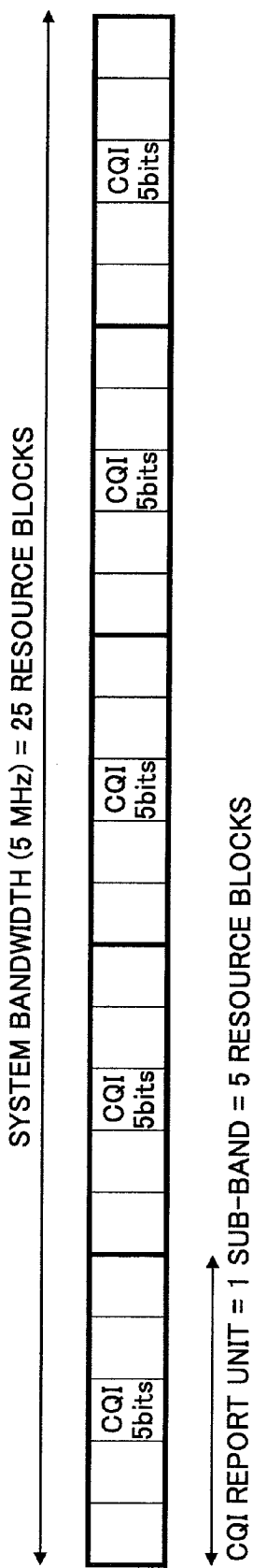
(b) LOW FREQUENCY RESOLUTION
CQI REPORT UNIT = 1 SUB-BAND = 5 RESOURCE BLOCKS

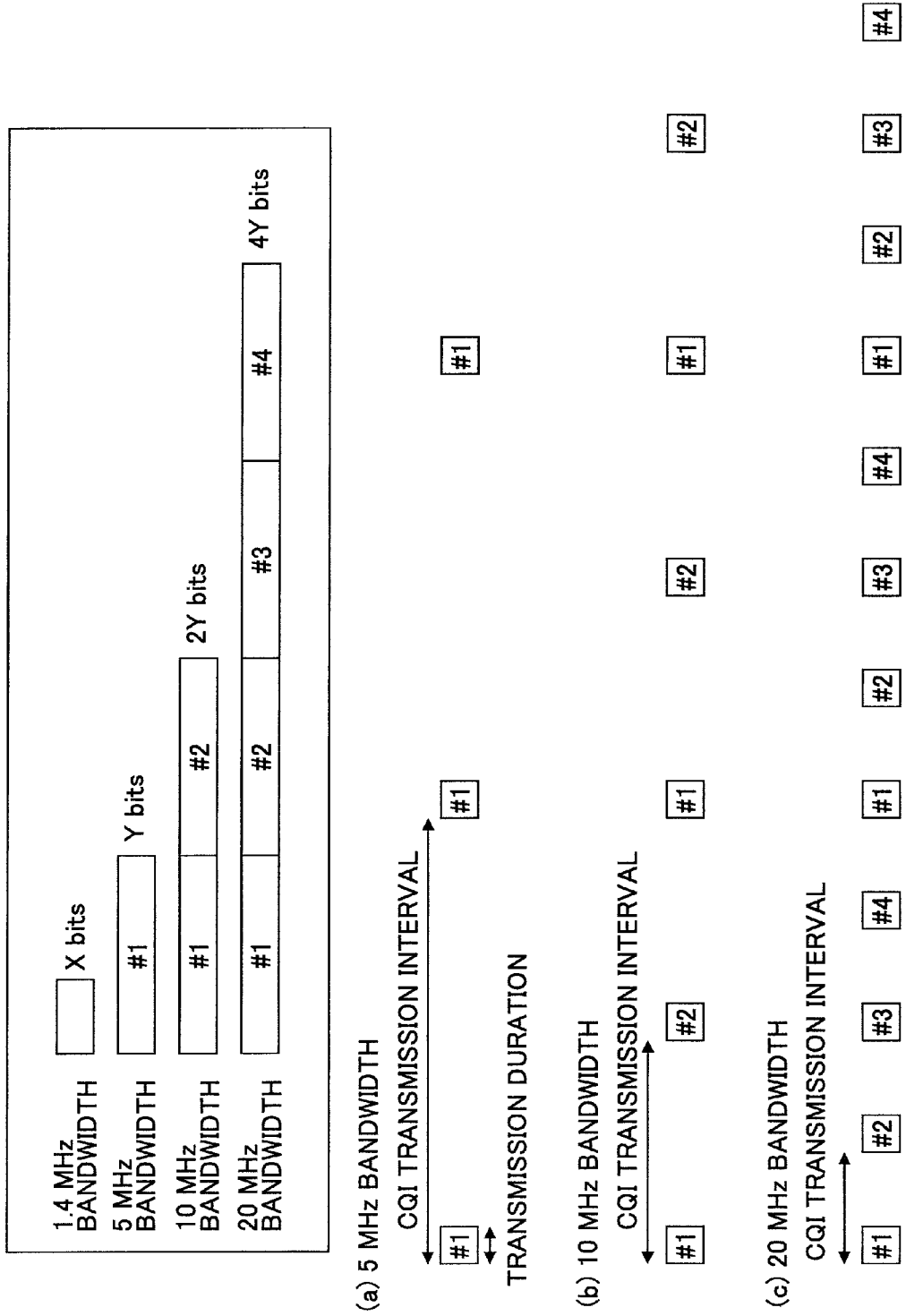

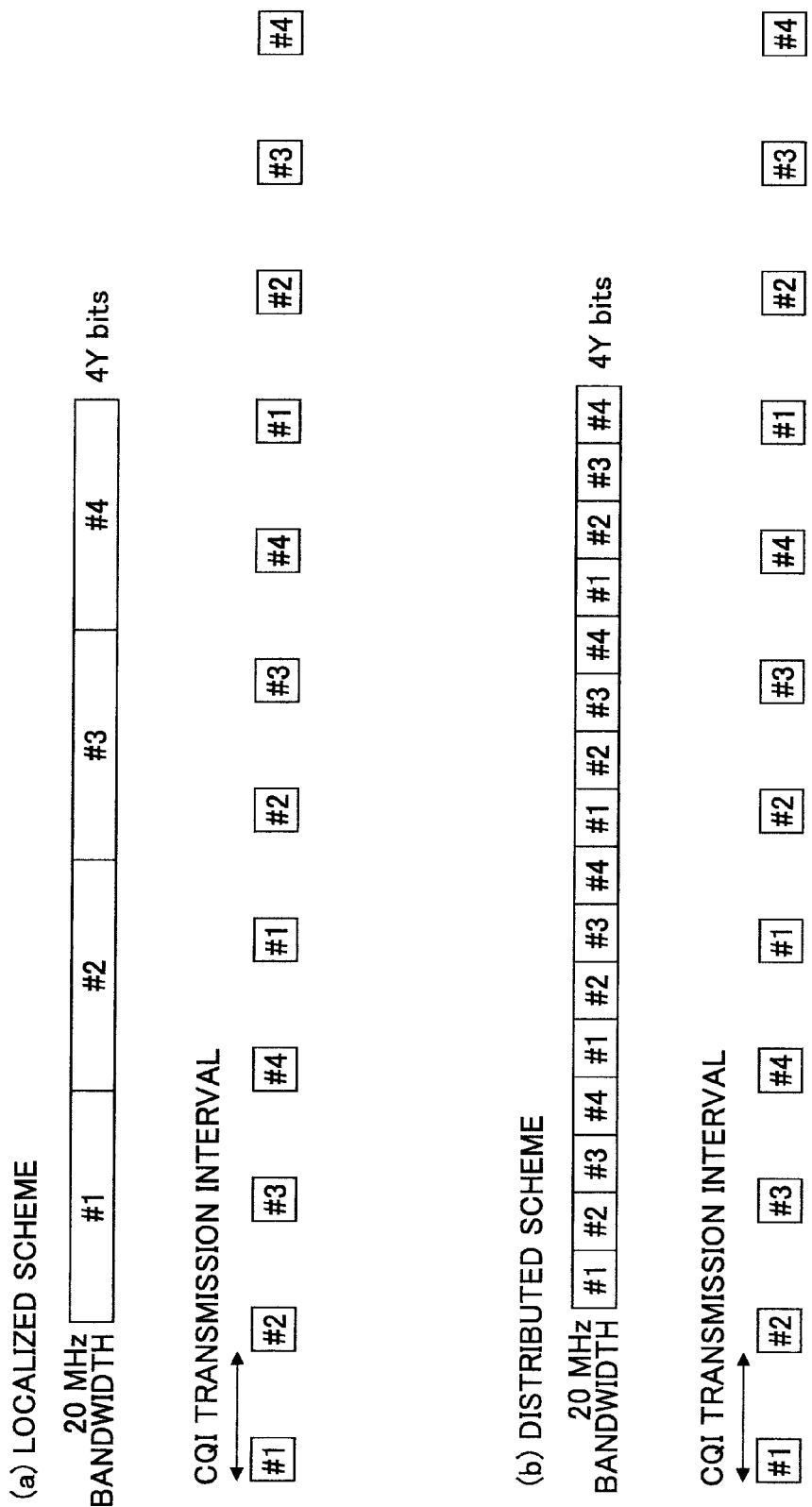

USER EQUIPMENT TERMINAL, BASE STATION, AND CHANNEL QUALITY INFORMATION REPORT METHOD

This application is a national stage application of international application no. PCT/JP2008/064539, which claims priority to Japanese Patent Application No. 2007-211597, filed on Aug. 14, 2007, the entire content of which is herein incorporated hereby by reference.

TECHNICAL FIELD

The present invention relates to a user equipment terminal, a base station, and a channel quality information report method.

BACKGROUND ART

In a mobile communication system such as an HSDPA (High Speed Downlink Packet Access) system, a user equipment terminal (UE) measures reception quality of a pilot channel and periodically reports channel quality information (CQI: Channel Quality Indicator) to a base station (at transmission intervals specified by the base station). The base station determines a modulation scheme, a coding rate, or the like based on the reported CQI (see 3GPP, TS25.214).

FIG. 1 shows CQI information transmitted in accordance with HSDPA. For example, the user equipment terminal measures reception quality of the pilot channel and reports a numerical value of 0-31 representing the reception quality to the base station. Specifically, the CQI (CQI_a1, CQI_a2, CQI_a3) is a value (absolute value) representing the channel quality with a predetermined number of bits (for example, five bits). When the base station receives a false CQI, the base station determines a false modulation scheme or a false coding rate. However, when the base station subsequently receives a correct CQI, the base station can determine a correct modulation scheme or a correct coding rate.

DISCLOSURE OF INVENTION

Problem(s) to be Solved by the Invention

As a next-generation communication system of the W-CDMA (Wideband Code Division Multiple Access) system and the HSDPA (High Speed Downlink Packet Access) system, an LTE (Long Term Evolution) system has been studied by 3GPP ($3^{rd}$ Generation Partnership Project). In the LTE system, it is contemplated that the user equipment terminal transmits acknowledge information (ACK/NACK) together with the CQI as uplink control information to the base station.

Uplink control information may grow when the user equipment terminal transmits acknowledge information together with the CQI. Controlling the modulation scheme or the coding rate in response to the increase in the uplink control information may degrade reception quality of the uplink control information.

In view of this problem, it is a general object of the present invention to maintain reception quality of channel quality information.

Means for Solving the Problem(s)

In one aspect of the present invention, there is provided a user equipment terminal for reporting channel quality information to a base station, including:

a channel quality information measuring unit configured to measure channel quality information; and a channel quality information generating unit configured to generate, as the channel quality information, a difference value between a first absolute value of the measured channel quality information and a second absolute value of previously measured channel quality information.

In another aspect of the present invention, there is provided a base station for receiving channel quality information from a user equipment terminal, including:

a control information receiving unit configured to receive, as the channel quality information, a difference value from an absolute value of previously determined channel quality information; and a channel quality information determining unit configured to determine channel quality information based on the absolute value and the difference value.

In another aspect of the present invention, there is provided a channel quality information report method in which a user equipment terminal reports channel quality information to a base station, including the steps of:

measuring, by the user equipment terminal, channel quality information;

generating, by the user equipment terminal, as the channel quality information, a difference value between a first absolute value of the measured channel quality information and a second absolute value of previously measured channel quality information;

receiving, by the base station, as the channel quality information, the difference value; and determining, by the base station, channel quality information based on the absolute value and the difference value.

Advantageous Effect of the Invention

According to an embodiment of the present invention, it is possible to maintain reception quality of channel quality information.

BRIEF DESCRIPTION OF THE DRAWINGS

FIGS. 12a and 12b shows the amount of information needed for a frequency-selective CQI report method.

FIGS. 19a, 19b and 19c shows CQI information transmitted according to a frequency-selective CQI report method in accordance with a fourth embodiment of the present invention (in the case of plural system bandwidths).

FIGS. 20a and 20b shows CQI information transmitted according to a frequency-selective CQI report method in accordance with the fourth embodiment of the present invention (in the case of the bandwidth of 20 MHz).

DETAILED DESCRIPTION OF THE PREFERRED EMBODIMENTS

Figure 1:
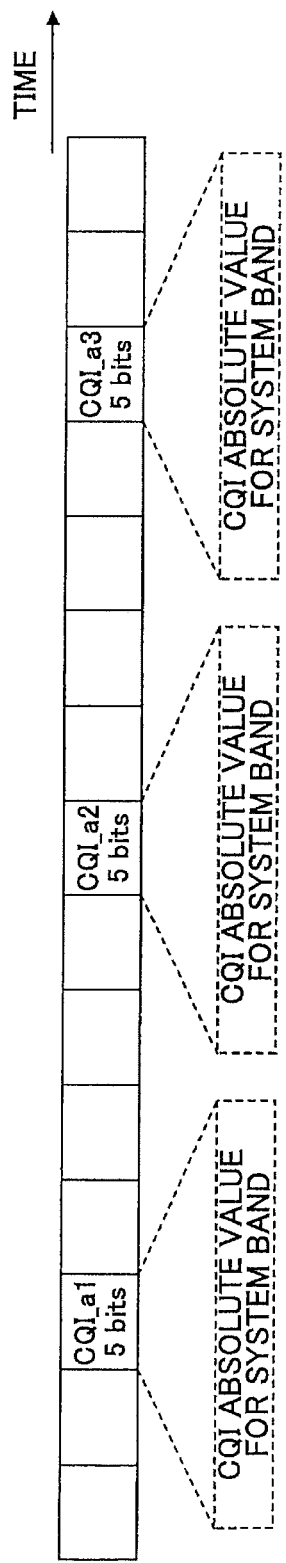
FIG. 1 shows CQI information transmitted according to HSDPA.

Description of Notations 10 user equipment terminal
101 system band CQI measuring unit
103 system band CQI generating unit
105 control information multiplexing unit
107 acknowledge information generating unit
109 band information receiving unit
111 resource block basis CQI measuring unit
113 sub-band basis CQI generating unit
151 channel encoding unit
153 time-multiplexing unit
20 base station
201 control information separating unit
203 system band CQI determining unit
205 sub-band basis CQI determining unit
207 band information transmitting unit

BEST MODE OF CARRYING OUT THE INVENTION

With reference to the accompanying drawings, embodiments of the present invention are described below.

First Embodiment

Examples where a CQI Difference Value is Reported

Figure 2:
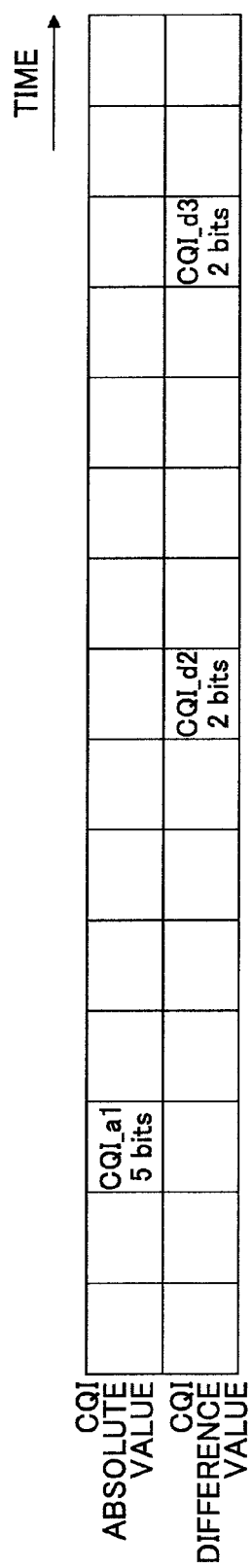
FIG. 2 shows a first example of CQI information transmitted according to a CQI report method in accordance with a first embodiment of the present invention.
Figure 3:
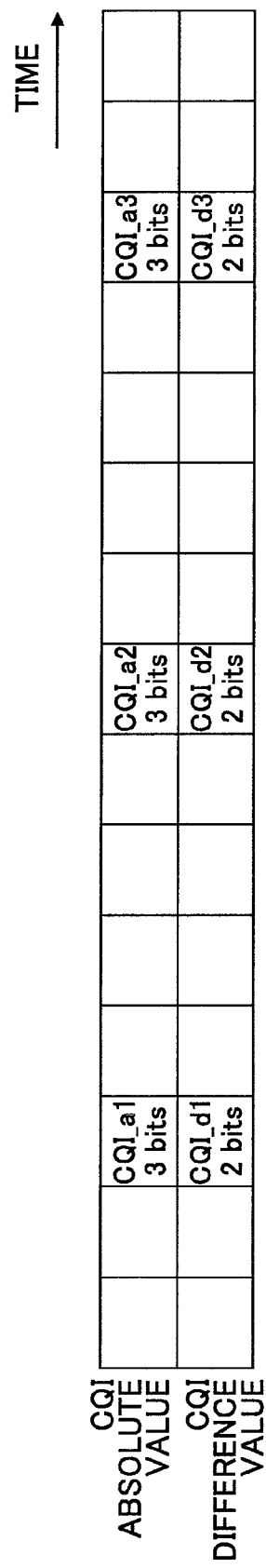
FIG. 3 shows a second example of CQI information transmitted according to a CQI report method in accordance with the first embodiment of the present invention.
Figure 4:
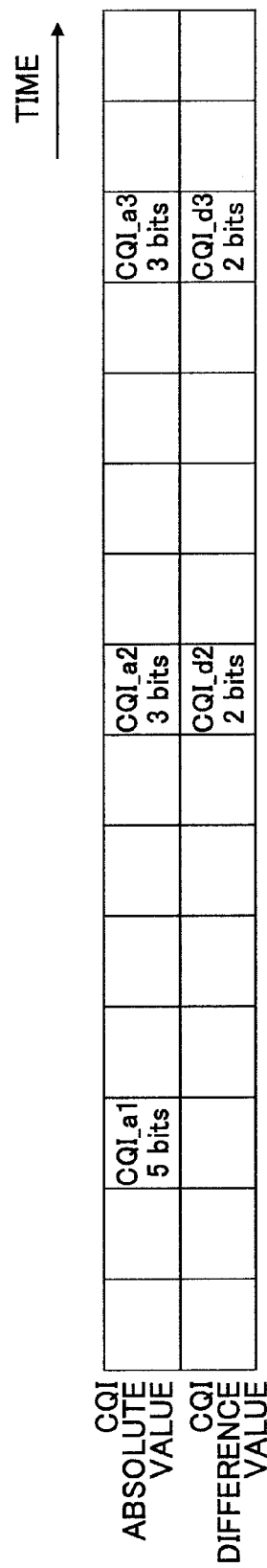
FIG. 4 shows a third example of CQI information transmitted according to a CQI report method in accordance with the first embodiment of the present invention.

With reference to FIGS. 2-4, CQI information transmitted according to a channel quality information (CQI) report method in accordance with a first embodiment of the present invention is described below. In the first embodiment, not only a CQI absolute value but also a difference value from the previously measured CQI is used. The CQI is expressed with a predetermined number of bits. In this embodiment, channel quality is expressed with a predetermined number of bits (for example, five bits which amount to thirty-two types of information). The CQI representing channel quality information with the predetermined number of bits (for example, five bits) is referred to as a CQI absolute value. For example, a smaller CQI absolute value means poorer channel quality, while a larger CQI absolute value means better channel quality.

On the other hand, a difference value from the previously measured CQI absolute value may be used to express the CQI. In other words, the CQI difference value is a value representing the difference between the currently measured CQI absolute value and the previously measured CQI absolute value with a predetermined number of bits (for example, two bits). When the propagation environment is stable, fluctuations in the CQI is small. Thus, a user equipment terminal need not transmit a CQI absolute value at each CQI transmission interval. Instead, the user equipment terminal may transmit a difference value to reduce the amount of information needed for the CQI report.

With reference to FIG. 2, one example of the CQI report method using a difference value is described below. In this example, a user equipment terminal measures and reports a CQI absolute value (CQI_a1) with five bits of information. Then, the user equipment terminal reports a difference value (CQI_d2) between the currently measured CQI and the previously measured CQI (CQI_a1). The difference value is expressed with two bits of information. When a base station receives the CQI difference value (CQI_d2), the base station can calculate CQI_a1+CQI_d2 using the previously determined CQI absolute value (CQI_a1) and determine the CQI with five bits of information. Similarly, when the base station receives a CQI difference value (CQI_d3), the base station can calculate CQI_a1+CQI_d2+CQI_d3 using the previously determined CQI (CQI_a1+CQI_d2) and determine the CQI with five bits of information.

It should be noted that for the purpose of reducing error propagation in the case where an error occurs in the CQI absolute value, a CQI absolute value with five bits of information is transmitted at a predetermined transmission interval specified by the base station.

With reference to FIG. 3, another example of the CQI report method using a difference value is described below. In this example, a user equipment terminal converts a CQI with five bits of information into a CQI (CQI_a1, CQI_a2, CQI_a3) with three bits of information representing the CQI with a smaller amount of information. This conversion makes the CQI coarser. For example, when the CQI is measured by the unit of 1 dB, this conversion makes the CQI by the unit of 4 dB. Accordingly, the user equipment terminal simultaneously reports a difference value (CQI_d1, CQI_d2, CQI_d3) between the currently measured CQI and the previously measured CQI. When a base station receives the CQI difference value (CQI_d2), the base station can calculate CQI_a1+CQI_d2 using the previously received CQI absolute value (CQI_a1) and determine the CQI with five bits of information. Similarly, when the base station receives a CQI difference value (CQI_d3), the base station can calculate CQI_a2+CQI_d3 using the previously received CQI (CQI_a2) and determine the CQI with five bits of information.

When the base station receives the CQI difference value (CQI_d2), the base station also simultaneously receives the CQI absolute value (CQI_a2) with three bits of information. Accordingly, the base station can determine an error in the CQI by comparing the determined CQI (CQI_a1+CQI_d2) with the currently received CQI absolute value (CQI_a2). For example, if CQI_a2−Δ<CQI_a1+CQI_d2<CQI_a2+Δ (Δ is a constant), then the base station can determine that the CQI is correctly received.

With reference to FIG. 4, another example of the CQI report method using a difference value is described below. In this example, a user equipment terminal measures and reports a CQI (CQI_a1) with five bits of information. Then, the user equipment terminal reports a CQI abstract value (CQI_a2, CQI_a3) with three bits of information and a CQI difference value (CQI_d2, CQI_d3) with two bits of information in a similar manner to FIG. 3. When a base station receives the CQI difference value (CQI_d2), the base station can calculate CQI_a1+CQI_d2 using the previously received CQI absolute value (CQI_a1) and determine the CQI with five bits of information. Similarly, when the base station receives a CQI difference value (CQI_d3), the base station can calculate CQI_a1+CQI_d2+CQI_d3 using the previously determined CQI (CQI_a1+CQI_d2) and determine the CQI with five bits of information.

Periodically transmitting a CQI with five bits of information in this manner can reduce error propagation in the case where an error occurs in the CQI absolute value.

As is the case with the example in FIG. 3, in the example shown in FIG. 4, when the base station receives the CQI difference value (CQI_d2), the base station also simultaneously receives the CQI absolute value (CQI_a2) with three bits of information. Accordingly, the base station can determine an error in the CQI as is the case with the example in FIG. 3.

First Embodiment

Examples where a CQI Difference Value and Acknowledge Information are Multiplexed With reference to FIGS. 5-7, methods of multiplexing the CQI difference value which is generated as shown in FIGS. 2-4 and acknowledge information into an uplink control channel are described below.

In LTE, acknowledge information (ACK/NACK) in response to downlink transmission data transmitted from a base station to a user equipment terminal is multiplexed together with the CQI into the uplink control channel. When the acknowledge information is multiplexed together with the CQI, the amount of information in the uplink control channel grows. Since limited resources can be assigned to the uplink control channel, the user terminal needs to reduce the amount of CQI information upon transmitting acknowledge information, in order to reduce degradation of reception quality due to an increase in the amount of information in the uplink control channel.

Figure 5:
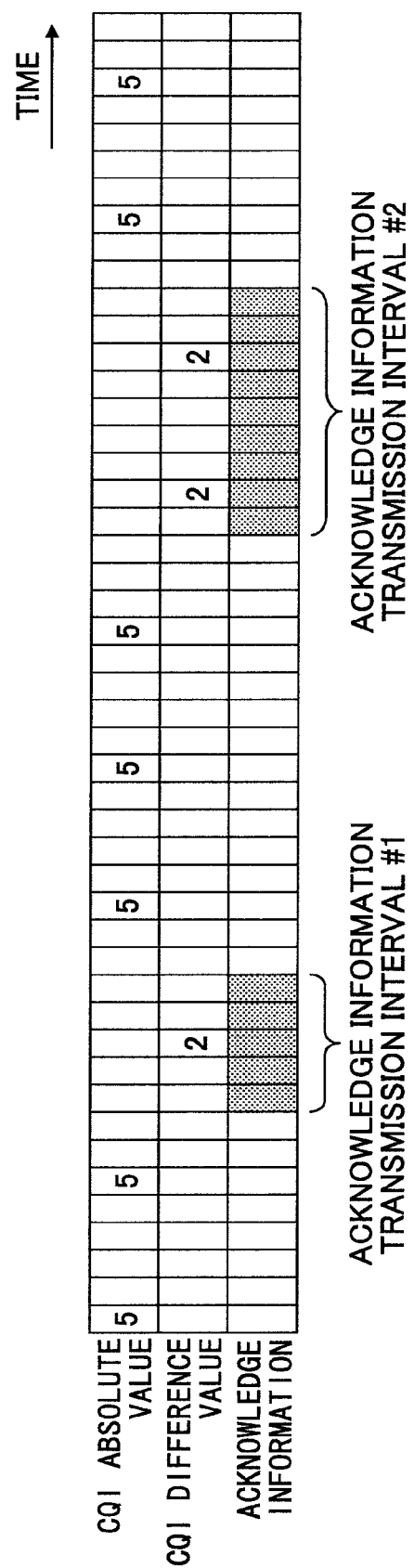
FIG. 5 shows an example where CQI information and acknowledge information are transmitted according to the CQI report method shown in FIG. 2.

With reference to FIG. 5, one example of a method of multiplexing the CQI and acknowledge information according to the CQI report method shown in FIG. 2 is described below. The user equipment terminal reports a CQI absolute value with five bits of information, when the user equipment terminal need not transmit acknowledge information. However, when the user equipment terminal needs to transmit acknowledge information (during acknowledge information transmission intervals #1 and #2), the user equipment terminal reports a CQI difference value with two bits of information. As a result, the amount of information in the uplink control channel is kept constant and reception quality of the uplink control channel is maintained.

Figure 6:
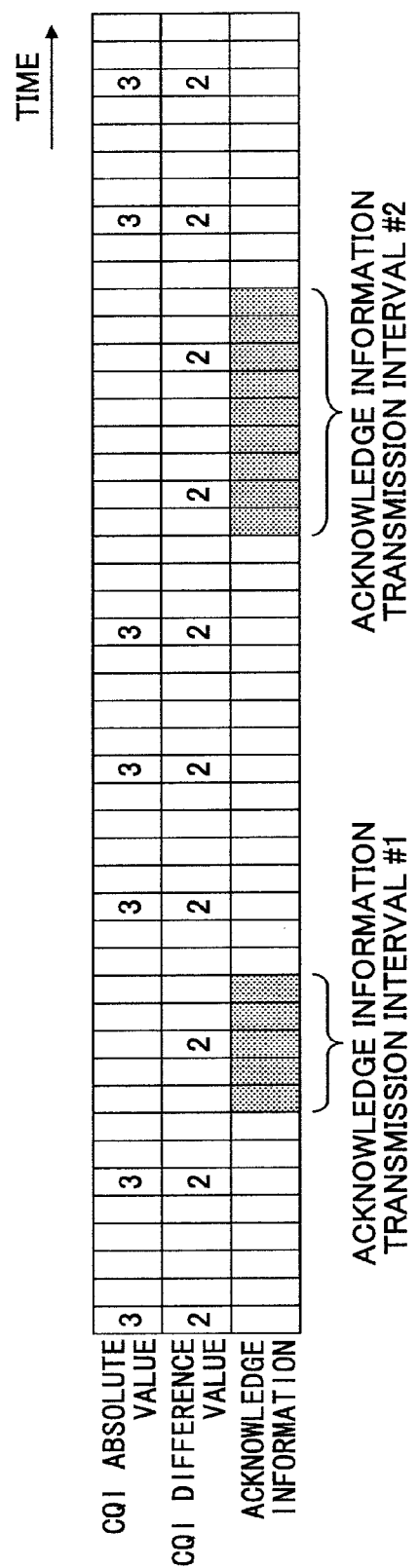
FIG. 6 shows an example where CQI information and acknowledge information are transmitted according to the CQI report method shown in FIG. 3.

With reference to FIG. 6, one example of a method of multiplexing the CQI and acknowledge information according to the CQI report method shown in FIG. 3 is described below. The user equipment terminal reports a CQI absolute value with three bits of information and a CQI difference value, when the user equipment terminal need not transmit acknowledge information. However, when the user equipment terminal needs to transmit acknowledge information (during acknowledge information transmission intervals #1 and #2), the user equipment terminal reports a CQI difference value with two bits of information. As a result, the amount of information in the uplink control channel is kept constant and reception quality of the uplink control channel is maintained.

Figure 7:
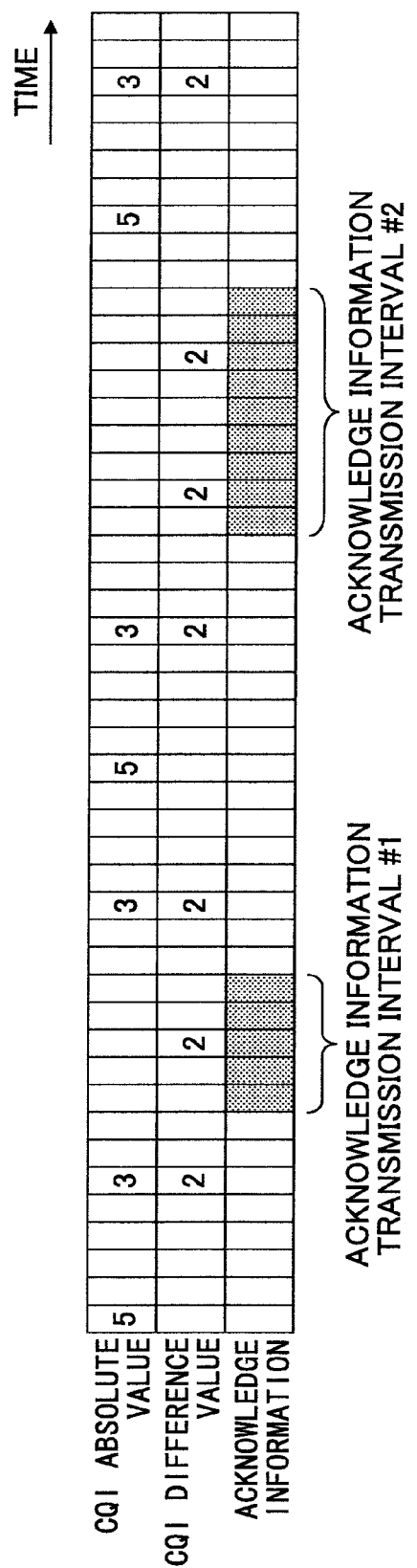
FIG. 7 shows an example where CQI information and acknowledge information are transmitted according to the CQI report method shown in FIG. 4.

With reference to FIG. 7, one example of a method of multiplexing the CQI and acknowledge information according to the CQI report method shown in FIG. 4 is described below. The user equipment terminal periodically reports a CQI absolute value with five bits of information. The user equipment terminal reports either a CQI absolute value with five bits of information or a CQI absolute value with three bits of information and a CQI difference value, when the user equipment terminal need not transmit acknowledge information. However, when the user equipment terminal needs to transmit acknowledge information (during acknowledge information transmission intervals #1 and #2), the user equipment terminal reports a CQI difference value with two bits of information. As a result, the amount of information in the uplink control channel is kept constant and reception quality of the uplink control channel is maintained.

Since the base station can uniquely identify the timing when acknowledge information is received in response to downlink transmission data, the base station can recognize that a CQI difference value rather than a CQI absolute value is reported when acknowledge information is received. Accordingly, when the base station receives the CQI difference value, the base station can determine (derive) a CQI with five bits of information using the previously determined CQI.

First Embodiment

Configuration of a User Equipment Terminal

Figure 8:
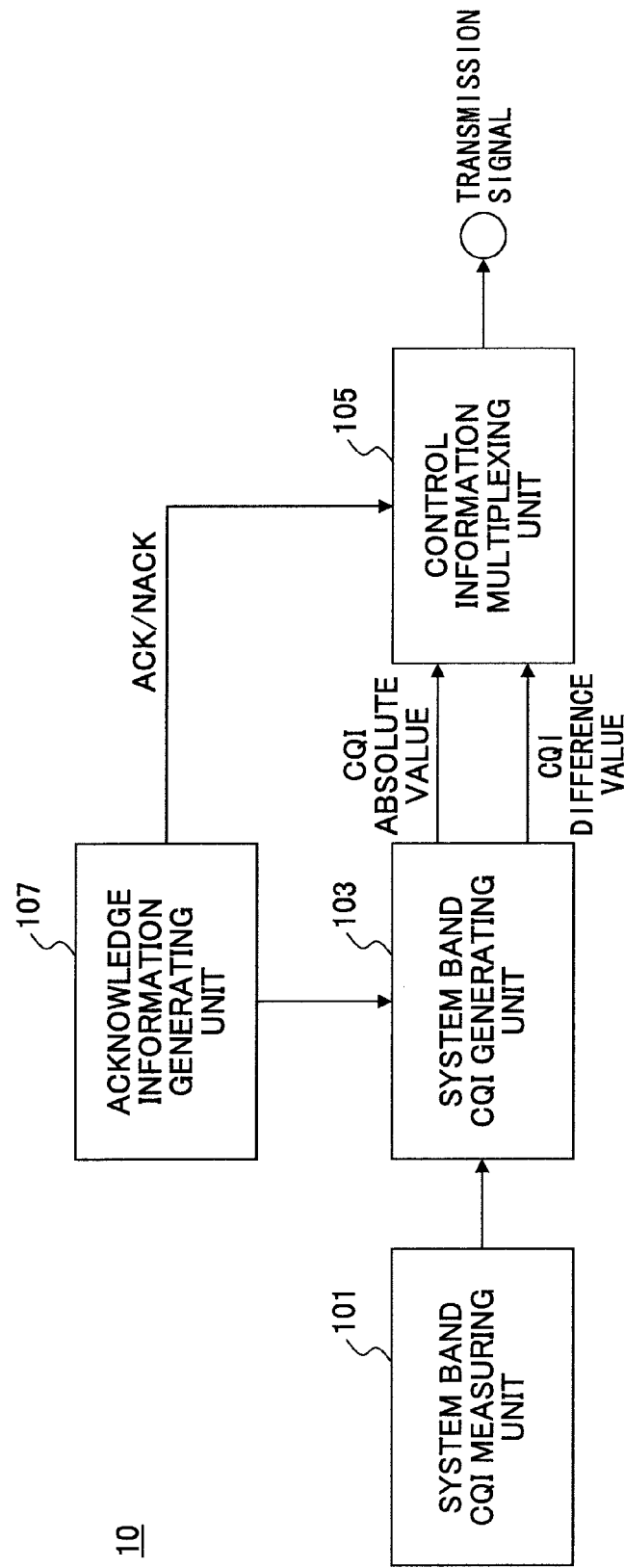
FIG. 8 shows a block diagram of a user equipment terminal in accordance with the first embodiment of the present invention.

With reference to FIG. 8, a configuration of a user equipment terminal 10 in accordance with the first embodiment is described below.

The user equipment terminal 10 includes a system band CQI measuring unit 101, system band CQI generating unit 103, control information multiplexing unit 105, and an acknowledge information generating unit 107.

The system band CQI measuring unit 101 receives a reference signal transmitted from the base station, for example, and measures a CQI for the system band. The CQI for the system band is expressed with a predetermined number of bits (for example, five bits).

The system band CQI generating unit 103 generates a CQI absolute value and a CQI difference value. For example, in order to generate the CQI shown in FIG. 2, the system band CQI generating unit 103 stores the previously measured CQI and generates a difference value (for example, two bits) between the currently measured CQI and the previously measured CQI. In addition, the system band CQI generating unit 103 periodically generates a CQI absolute value (for example, five bits). In order to generate the CQI shown in FIG. 3, the system band CQI generating unit 103 generates a CQI absolute value (for example, three bits) representing the CQI with a smaller amount of information. The system band CQI generating unit 103 also stores the previously measured CQI and simultaneously generates a differential value (for example, two bits) between the currently measured CQI and the previously measured CQI. In order to generate the CQI shown in FIG. 4, the system band CQI generating unit 103 generates a CQI absolute value (for example, three bits) representing the CQI with a smaller amount of information. The system band CQI generating unit 103 also stores the previously measured CQI and simultaneously generates a differential value (for example, two bits) between the currently measured CQI and the previously measured CQI. In addition, the system band CQI generating unit 103 periodically generates a CQI absolute value (for example, five bits).

The acknowledge information generating unit 107 determines an error in downlink transmission data from the base station and generates acknowledge information. Specifically, the acknowledge information generating unit 107 generates ACK in the case of successful reception and NACK in the case of erroneous reception.

The control information multiplexing unit 105 multiplexes the CQI and the acknowledge information. Specifically, when the acknowledge information needs to be transmitted, the control information multiplexing unit 105 multiplexes the CQI difference value (for example, two bits) and the acknowledge information. When the acknowledge information need not be transmitted, the control information multiplexing unit 105 multiplexes either the CQI absolute value (for example, five bits) or the CQI absolute value with the smaller amount of information (for example, three bits) and the CQI difference value (for example, two bits). The multiplexed control information is transmitted to the base station on the uplink control channel.

First embodiment

Configuration of a Base Station

Figure 9:
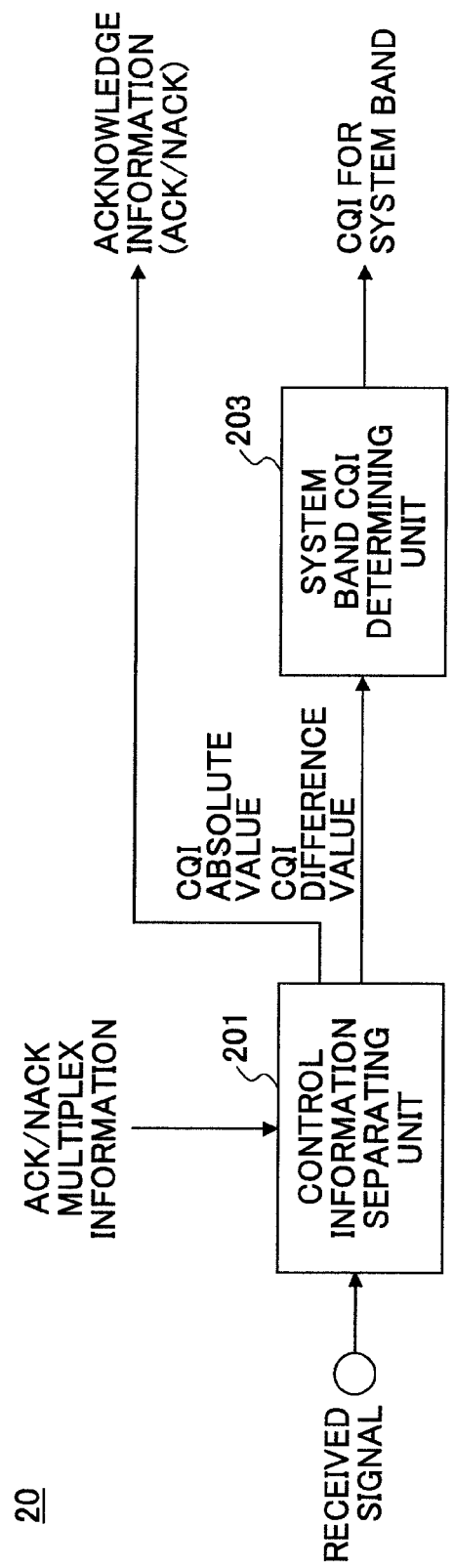
FIG. 9 shows a block diagram of a base station in accordance with the first embodiment of the present invention.

With reference to FIG. 9, a configuration of a base station 20 in accordance with the first embodiment is described below.

The base station 20 includes a control information separating unit 201 and a system band CQI determining unit 203.

The control information separating unit 201 determines whether acknowledge information is to be received and separates the acknowledge information from CQIs. The acknowledge information is used for retransmission control and the separated CQIs (a CQI absolute value and a CQI difference value) is supplied to the system band CQI determining unit 203.

The system band CQI determining unit 203 receives the CQI absolute value and the CQI difference value and determines the CQI for the system band. For example, upon receiving the CQI shown in FIG. 2, the system band CQI determining unit 203 outputs the CQI absolute value (for example, five bits) as it is (without being processed). For the CQI difference value (for example, two bits), the system band CQI determining unit 203 calculates the CQI for the system band using the previously determined CQI together with the CQI difference value and outputs the CQI for the system band. Upon receiving the CQI shown in FIG. 3, the system band CQI determining unit 203 receives the CQI absolute value (for example, three bits) and the CQI difference value (for example, two bits), calculates the CQI for the system band using the previously determined CQI together with the CQI difference value, and outputs the CQI for the system band. Upon receiving the CQI shown in FIG. 4, the system band CQI determining unit 203 outputs the CQI absolute value (for example, five bits) as it is (without being processed). For the CQI difference value (for example, two bits), the system band CQI determining unit 203 calculates the CQI for the system band using the previously determined CQI together with the CQI difference value and outputs the CQI for the system band.

When the CQI absolute value with the smaller amount of information is received as shown in FIGS. 3 and 4, the system band CQI determining unit 203 may determine an error in the CQI by comparing the CQI for the system band calculated using the CQI difference value with the currently received CQI absolute value with the smaller amount of information.

The CQI for the system band output from the system band CQI determining unit 203 is used for scheduling in assigning radio resources for transmitting and receiving data to and from the user equipment terminal.

First Embodiment

Flowchart of a CQI Report Method

Figure 10:
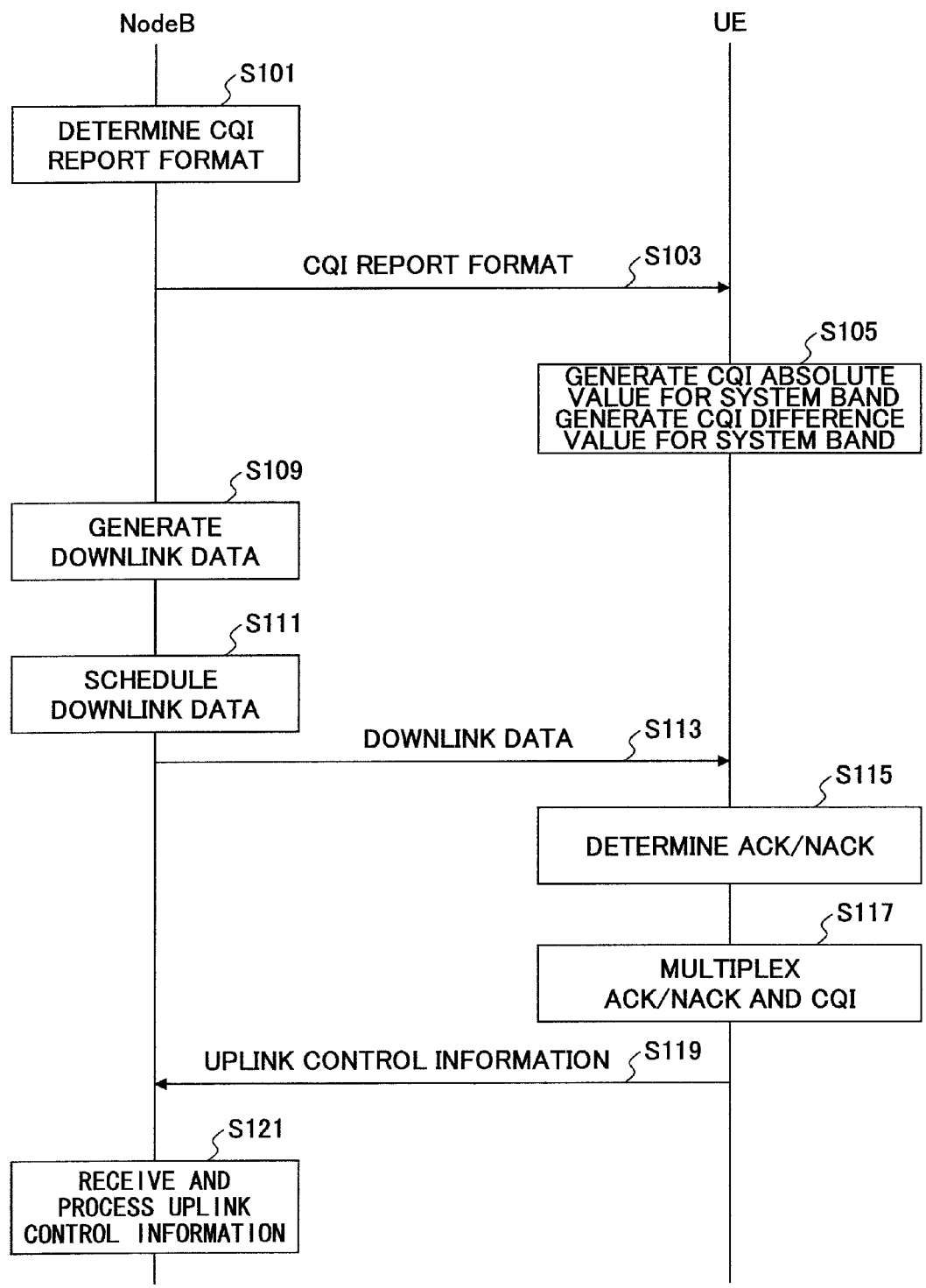
FIG. 10 shows a flowchart of a CQI report method in accordance with the first embodiment of the present invention.

With reference to FIG. 10, a flowchart of a CQI report method in accordance with the first embodiment is described below.

First, the base station (NodeB) determines a CQI report format (step S101). For example, the base station determines which format is to be used among the CQI report formats shown in FIGS. 2-4. The CQI transmission interval may be specified in the CQI report format. The CQI report format is transmitted to the user equipment terminal via downlink signaling or the like (step S103).

The user equipment terminal (UE) generates a CQI absolute value or a CQI difference value for the system band at the CQI transmission interval specified by the base station (step S105). It should be noted that the user equipment terminal generates the CQI absolute value or the CQI difference value for the system band at the CQI transmission interval specified by the base station even when there are no downlink transmission data (not shown).

When downlink transmission data to be transmitted from the base station to the user equipment terminal are generated (step S109), the base station performs scheduling of the data (step S111) and transmits the data to the user equipment terminal (step S113). The user equipment terminal determines an error in the downlink transmission data (step S115) and multiplexes the determination result (ACK/NACK) and the CQI into the uplink control channel (step S117). The CQI multiplexed in this step is the CQI difference value. Then, the user equipment terminal transmits control information multiplexed into the uplink control channel (step S119). The uplink control information is separated by the base station. The acknowledge information is used to determine whether retransmission is needed and the CQI is used for scheduling (step S121).

Although channel quality information for the system band is reported as a difference value in the first embodiment, the first embodiment is not limited to the report on the channel quality information for the system band. The first embodiment is also applicable to the report on channel quality information for a portion of the system band.

Second Embodiment

Example where a Frequency-Selective CQI is Reported

Next, a frequency-selective CQI report method is described below. In a mobile communication system such as an LTE system, the system band is divided into plural frequency blocks. The frequency block is referred to as a resource block, which is a minimum unit in the frequency domain for allocating radio resources to a user equipment terminal. In this mobile communication system, the base station performs scheduling in consideration of fluctuations in channel quality information in the frequency domain. Channel quality information which represents fluctuations in channel quality information in the frequency domain and is reported from the user equipment terminal to the base station is referred to as a frequency-selective CQI.

For example, when the system band is divided into twenty-five resource blocks, the frequency-selective CQI may include CQIs for twenty-five resource blocks. Alternatively, the frequency-selective CQI may include CQIs for five sub-bands, each of which groups five resource blocks. The sub-band is a group of resource blocks consisting of at least one resource block, which can be used to reduce the amount of frequency-selective CQI.

Figure 11:
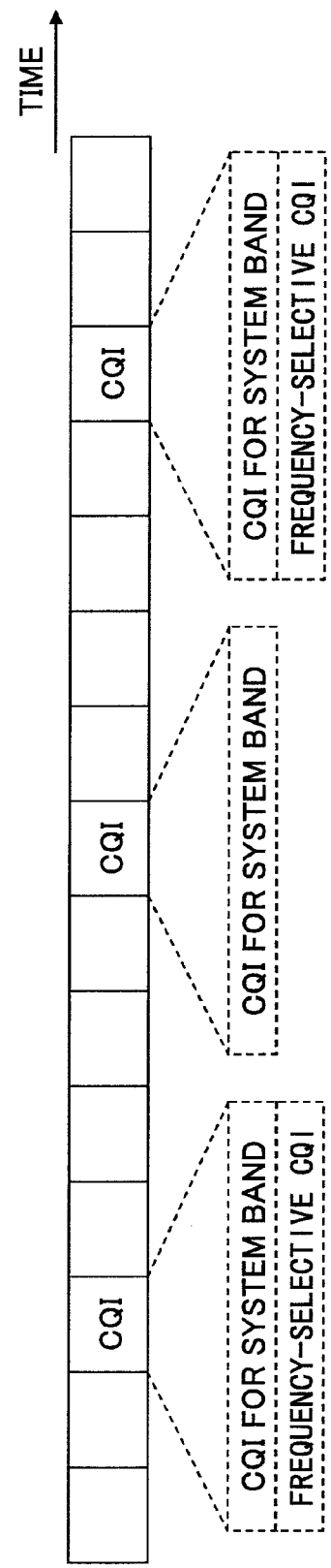
FIG. 11 shows CQI information transmitted according to a CQI report method using a system band CQI and a frequency-selective CQI.

FIG. 11 shows one example where a user equipment terminal reports a frequency-selective CQI. The user equipment terminal reports a CQI for the system band at the interval specified by the base station. In addition, the user equipment terminal reports a frequency-selective CQI together with the CQI for the system band. It should be noted that the frequency-selective CQI may be omitted based on an instruction by the base station.

The amount of information needed for the frequency-selective CQI varies according to the number of sub-bands included in the system band. For example, it is assumed that channel quality information is expressed as a CQI with five bits. As shown in FIG. 12($a$), when the system band consists of twenty-five sub-bands (when one sub-band consists of one resource block), the amount of information needed for the frequency-selective CQI is 25*5=125 bits. As shown in FIG. 12($b$), on the other hand, when the system band consists of five sub-bands (when one sub-band consists of five resource blocks), the amount of information needed for the frequency-selective CQI is 5*5=25 bits.

When the number of sub-bands included in the system band varies in this manner (when frequency resolution varies), the amount of information for reporting the frequency-selective CQI also varies. When a modulation scheme or a coding rate is controlled according to the variation in the amount of information, reception quality of the uplink control information may be degraded. Accordingly, when the number of sub-bands included in the system band varies, it is necessary to keep constant the amount of information for the frequency-selective CQI to be reported at a single transmission timing so as not to degrade reception quality of control information.

Figure 13:
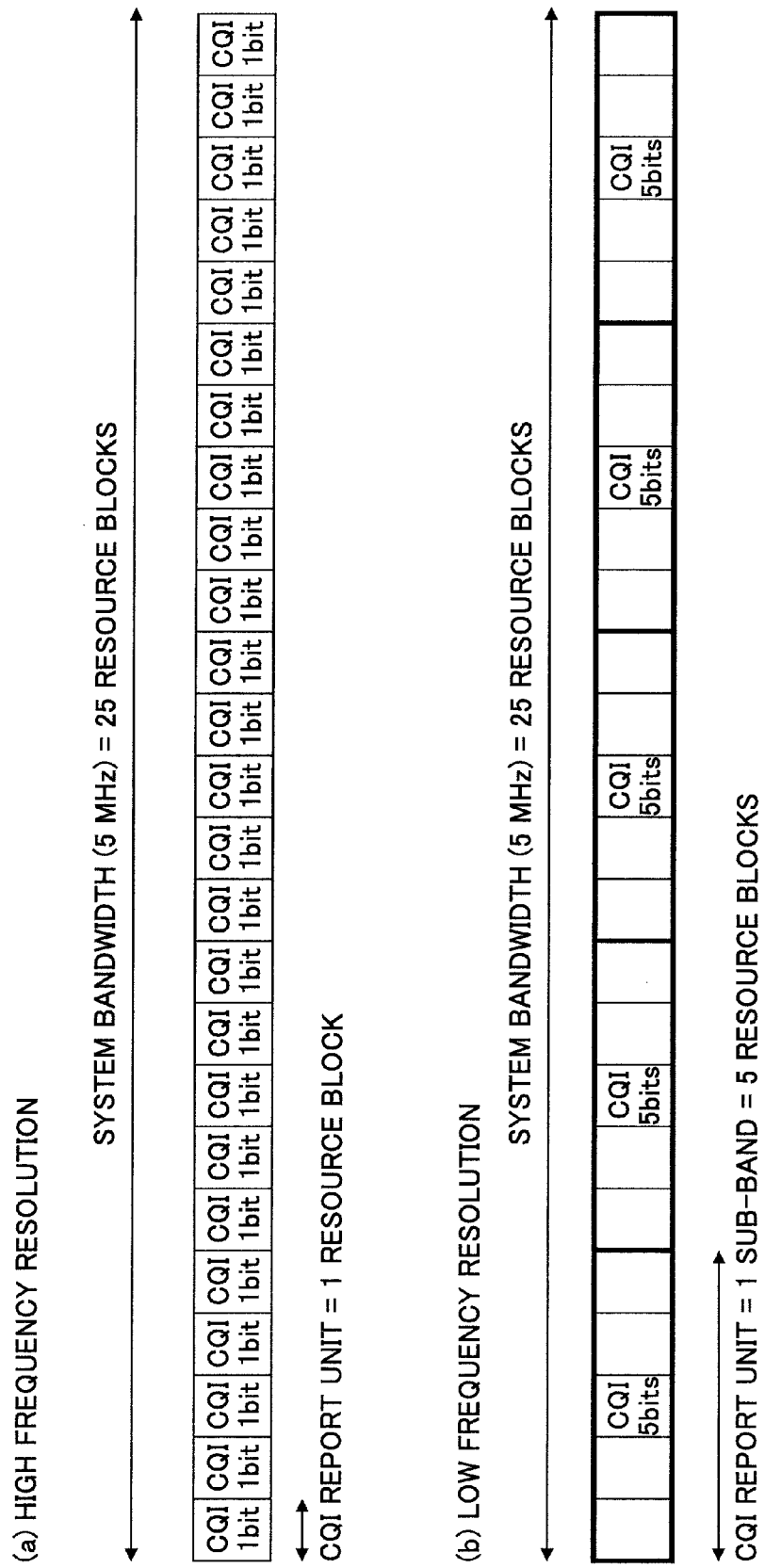
FIGS. 13a and 13b shows CQI information transmitted according to a frequency-selective CQI report method in accordance with a second embodiment of the present invention.

With reference to FIG. 13, one example of a frequency-selective CQI report method in accordance with a second embodiment of the present invention is described below. In the second embodiment, the amount of CQI information for each sub-band is controlled according to the number of sub-bands included in the system band. For example, as shown in FIG. 13($a$), when the system band consists of twenty-five sub-bands, the amount of CQI information for each sub-band is determined to be one bit. As shown in FIG. 13($b$), when the system band consists of five sub-bands, the amount of CQI information for each sub-band is determined to be five bits. Controlling the amount of CQI information in this manner allows the amount of information needed for the frequency-selective CQI to be kept constant (twenty-five bits) in both cases.

Third Embodiment

Example where a Frequency-Selective CQI is Reported

Figure 14:
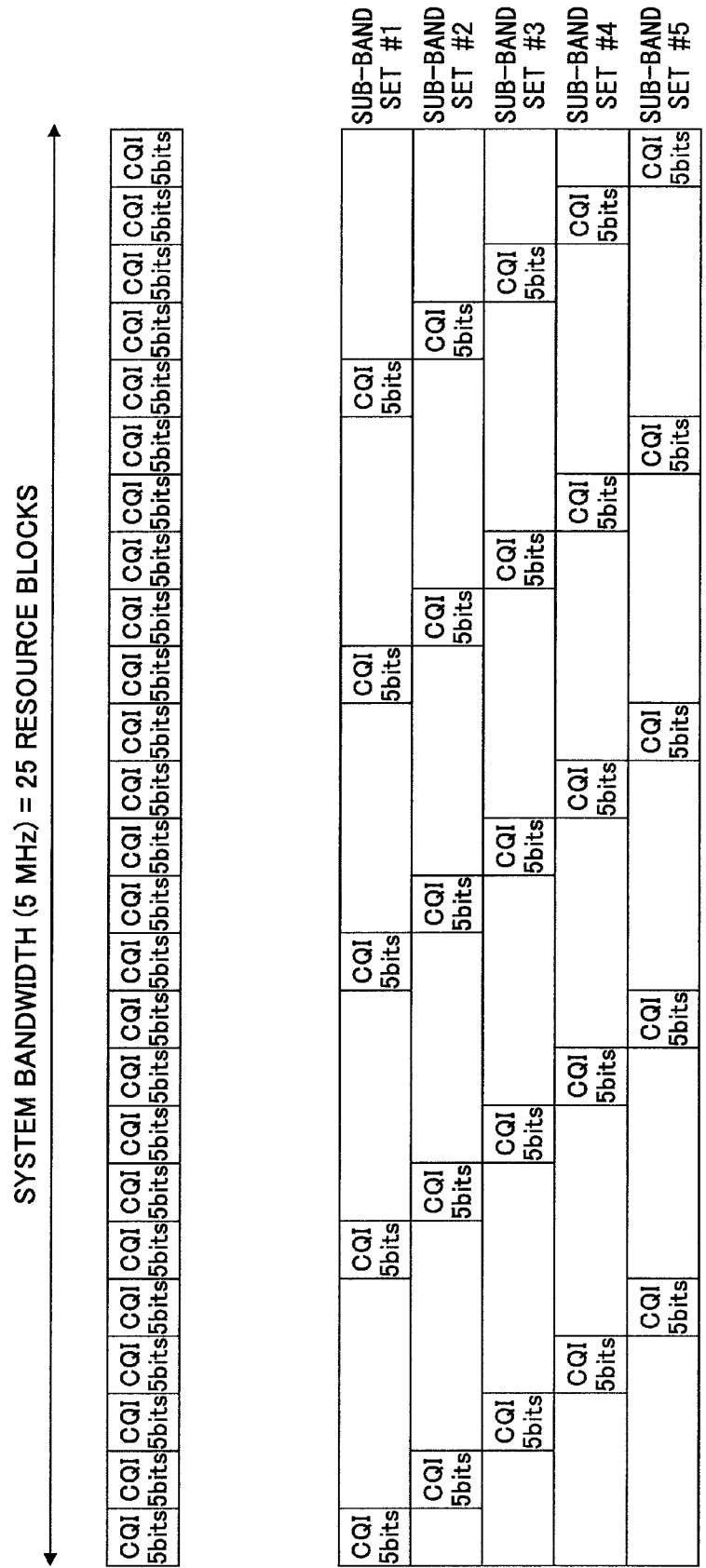
FIG. 14 shows CQI information transmitted according to a frequency-selective CQI report method in accordance with a third embodiment of the present invention.

With reference to FIG. 14, one example of a frequency-selective CQI report method in accordance with a third embodiment of the present invention is described below. In the third embodiment, sub-bands are grouped such that the amount of information to be transmitted at a time is kept constant. FIG. 14 shows an example where the system band consists of twenty-five sub-bands. When the CQI with five bits is reported for each sub-band, 5*25=125 bits are needed. In order to reduce the amount of information to that (twenty-five bits) of FIG. 13($b$), the system band is divided into sub-band sets #1-#5. Dividing the amount of information to be reported in this manner allows the amount of information which is to be transmitted at a time to be kept constant. Specifically, the user equipment terminal groups CQIs for the respective sub-bands in the system band based on the number of sub-bands included in the system band, and then reports a set of the grouped CQIs to the base station. Grouping the frequency-selective CQI in this manner allows the amount of information to be kept constant.

Second or Third Embodiment Configuration of a User Equipment Terminal

Figure 15:
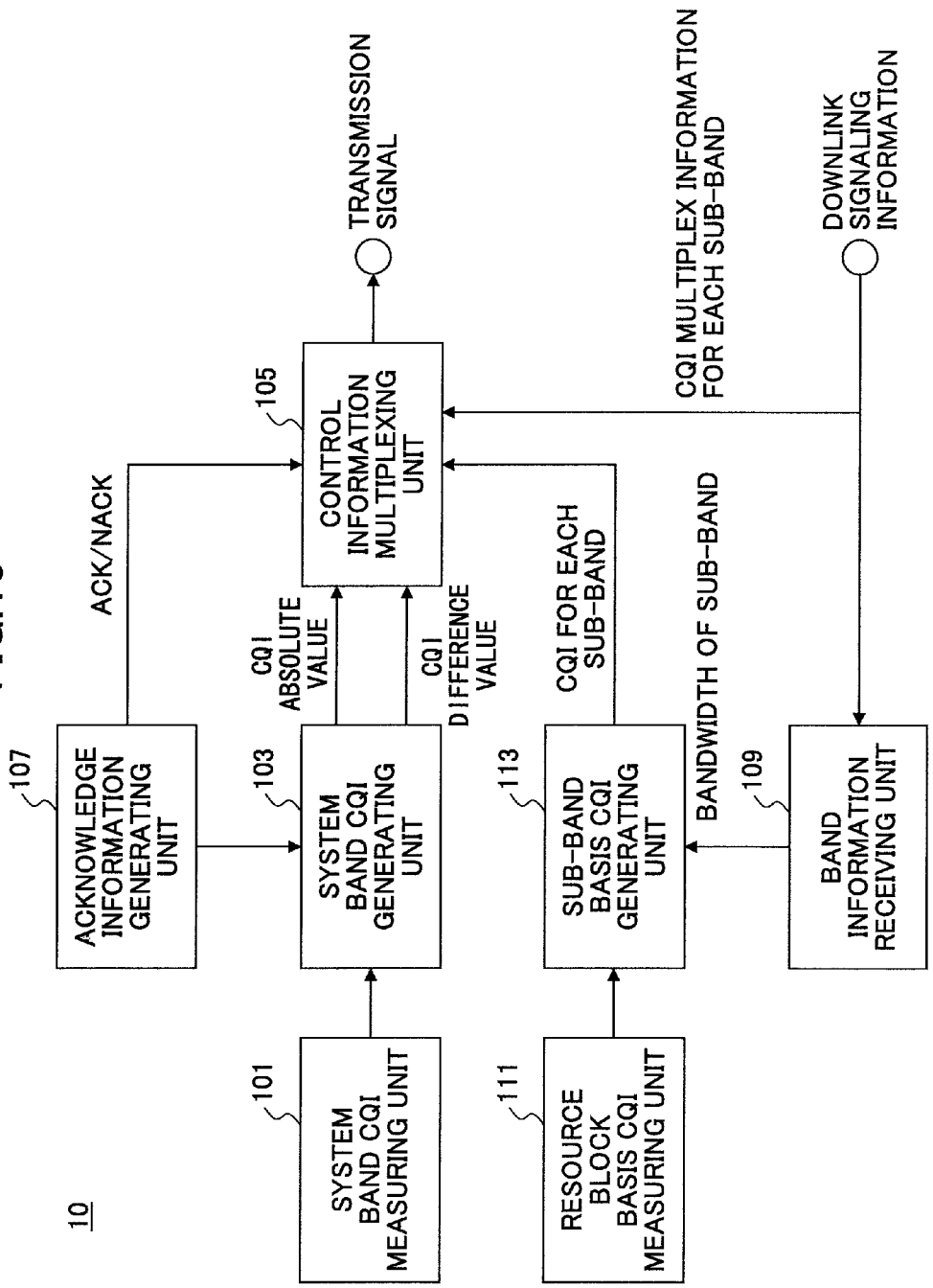
FIG. 15 shows a block diagram of a user equipment terminal in accordance with the second or third embodiment of the present invention.

With reference to FIG. 15, a configuration of a user equipment terminal 10 in accordance with the second or third embodiment is described below.

The user equipment terminal 10 includes a system band CQI measuring unit 101, a system band CQI generating unit 103, a control information multiplexing unit 105, an acknowledge information generating unit 107, a band information receiving unit 109, a resource block basis CQI measuring unit 111, and a sub-band basis CQI generating unit 113. The system band CQI measuring unit 101, the system band CQI generating unit 103, the control information multiplexing unit 105, and the acknowledge information generating unit 107 have the same functions as those of the user equipment terminal in FIG. 8, and thus their repetitive discussions are omitted.

The band information receiving unit 109 receives from the base station the number of sub-bands included in the system band (frequency resolution).

The resource block basis CQI measuring unit 111 receives a reference signal transmitted from the base station, for example, and measures a CQI for each resource block.

The sub-band basis CQI generating unit 113 groups the CQIs for the respective resource blocks on the sub-band basis and generates a CQI for each sub-band. For example, in order to generate the CQI for each sub-band shown in FIG. 13, the sub-band basis CQI generating unit 113 generates a CQI, which has the amount of information determined according to the number of sub-bands included in the system band, for each sub-band. In order to generate the CQI for each sub-band shown in FIG. 14, the sub-band basis CQI generating unit 113 groups the CQIs for the respective sub-bands according to a predetermined amount of information available for transmission and generates a set of the grouped CQIs.

The control information multiplexing unit 105 multiplexes CQIs (a CQI absolute value and a CQI difference value) for the system band, the CQIs for the respective sub-bands, and acknowledge information. The multiplexed control information is transmitted to the base station on the uplink control channel.

Figure 16:
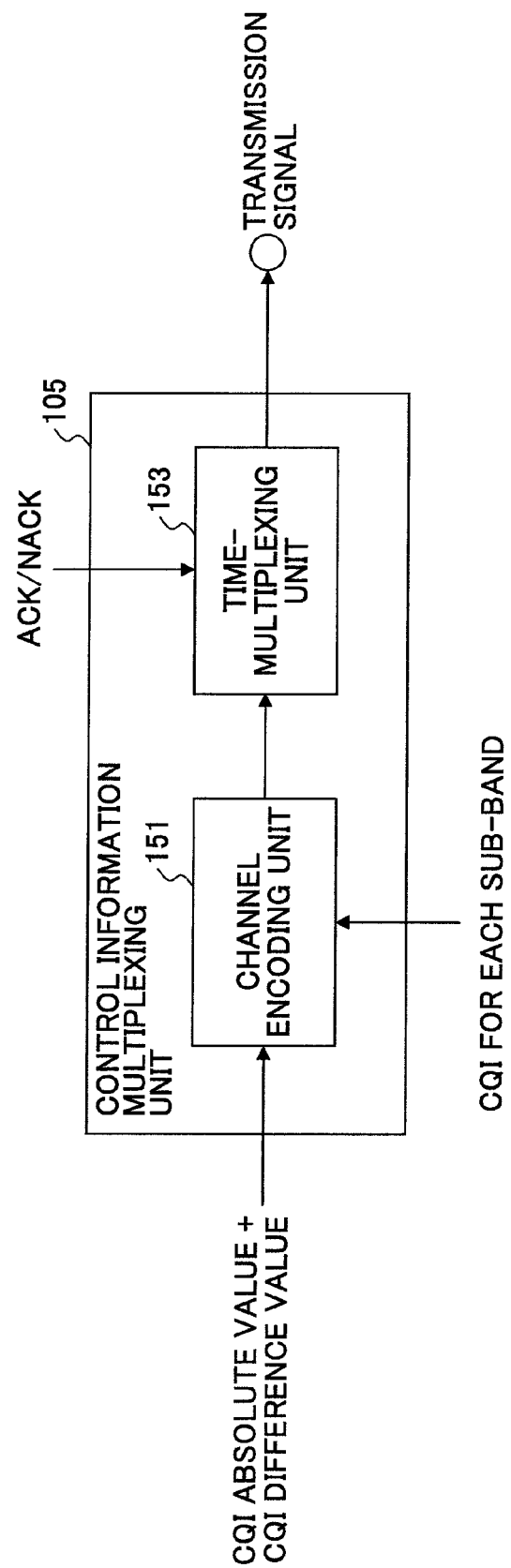
FIG. 16 shows a block diagram of an uplink control channel multiplexing unit shown in FIG. 15.

With reference to FIG. 16, the configuration of the control information multiplexing unit 105 is described in detail below.

The control information multiplexing unit 105 includes a channel encoding unit 151 and a time-multiplexing unit 153. The channel encoding unit 151 channel-encodes the CQIs (the CQI absolute value and the CQI difference value) for the system band and the CQIs for the respective sub-bands at the same time (as a whole). Encoding control information at the same time in this manner can improve the encoding gain. In addition, the time-multiplexing unit 153 multiplexes the channel-encoded CQIs and the acknowledge information in the time domain. Time-multiplexing the CQIs and the acknowledge information in the time domain allows the base station to separate the acknowledge information from the CQIs in the time domain. In other words, the base station can separate the acknowledge information from the CQIs without channel-decoding. Accordingly, the base station can quickly process the acknowledge information.

Second or Third Embodiment

Configuration of a Base Station

Figure 17:
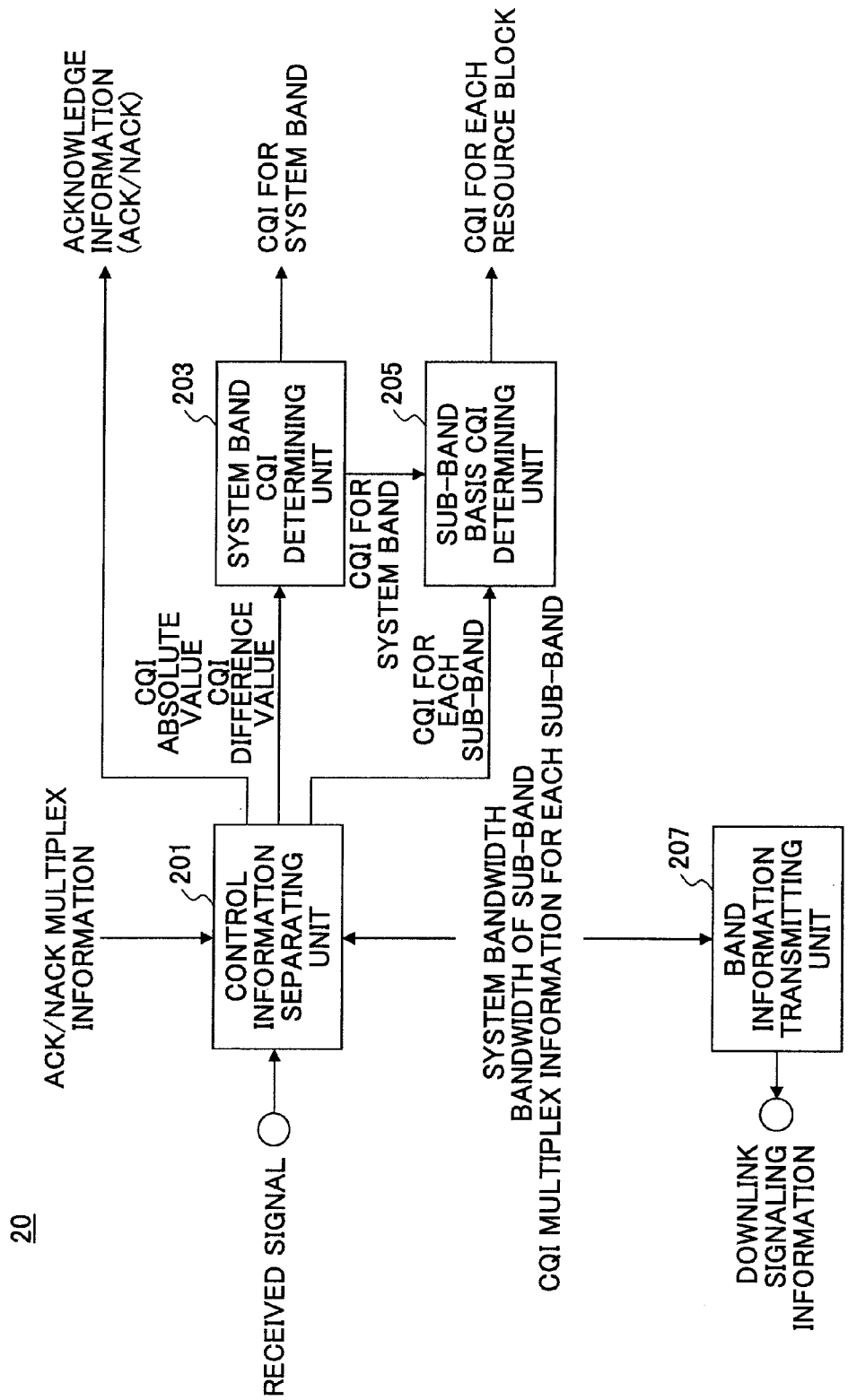
FIG. 17 shows a block diagram of a base station in accordance with the second or third embodiment of the present invention.

With reference to FIG. 17, a configuration of a base station 20 in accordance with the second or third embodiment is described below.

The base station 20 includes a control information separating unit 201, a system band CQI determining unit 203, a sub-band basis CQI determining unit 205, and a band information transmitting unit 207. The control information separating unit 201 and the system band CQI determining unit 203 have the same functions as those of the base station in FIG. 9, and thus their repetitive discussions are omitted.

The control information separating unit 201 separates acknowledge information from CQIs. Furthermore, the CQIs are separated into CQIs (a CQI absolute value and a CQI difference value) for the system band and CQIs for the respective sub-bands referring to the number of sub-bands included in the system band (or referring to the system bandwidth and the bandwidth of the sub-band).

The sub-band basis CQI determining unit 205 generates a CQI for each sub-band referring to the CQI for the system band. For example, in order to generate the CQI for each sub-band shown in FIG. 13, the sub-band basis CQI determining unit 205 generates a CQI, which has the amount of information determined according to the number of sub-bands included in the system band. In order to generate the CQI for each sub-band shown in FIG. 14, the sub-band basis CQI determining unit 205 generates a CQI for a predetermined group (sub-band set). The CQI for each sub-band is converted into CQI information for each resource block based on interpolation or the like, and then used for scheduling.

The number of sub-bands included in the system band or grouping information for grouping sub-bands (combination of sub-bands) is transmitted by the band information transmitting unit 207 to the user equipment terminal via downlink signaling.

Second or Third Embodiment

Flowchart of a CQI Report Method

Figure 18:
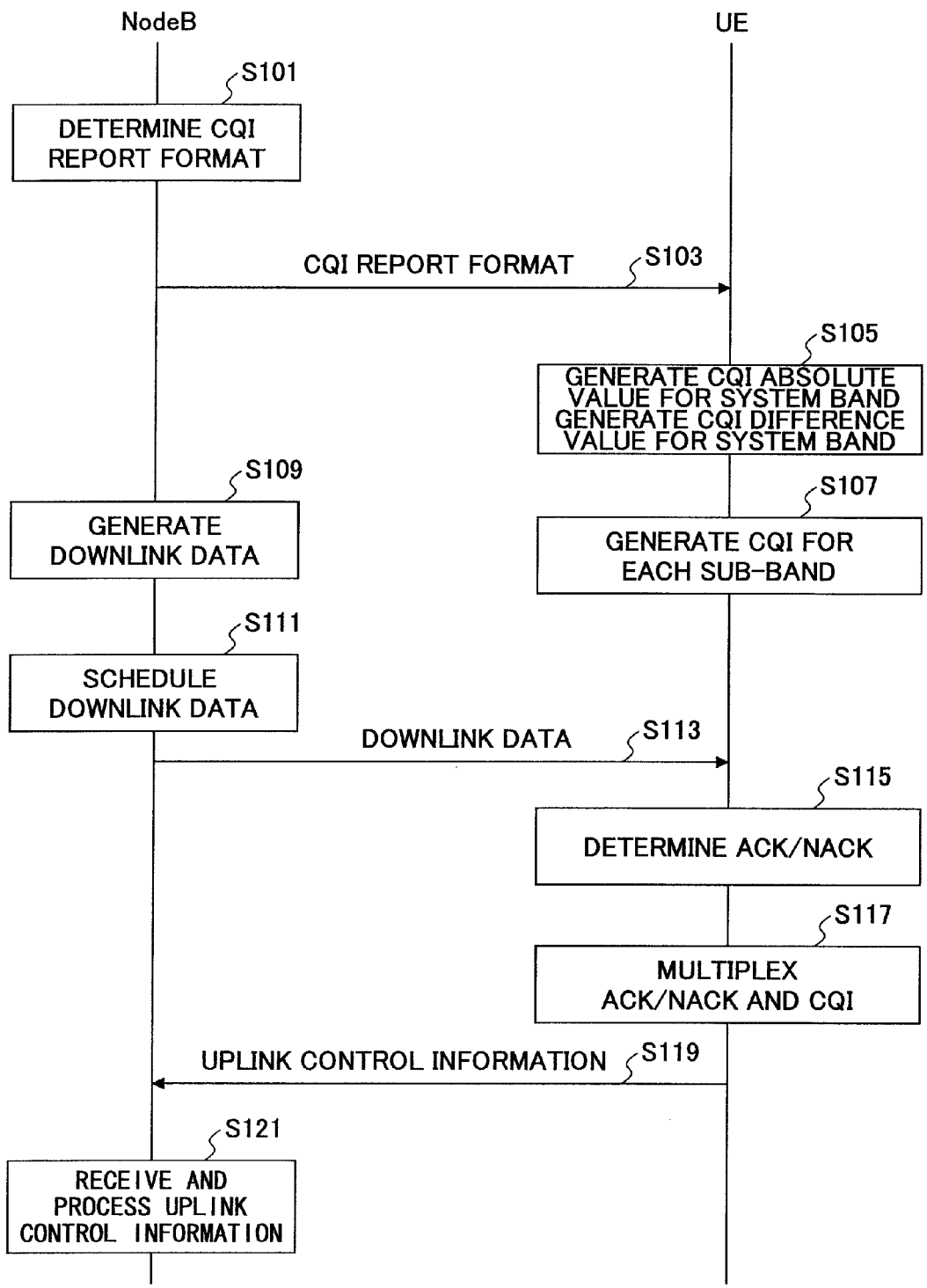
FIG. 18 shows a flowchart of a frequency-selective CQI report method in accordance with the second or third embodiment of the present invention.

With reference to FIG. 18, a flowchart of a frequency-selective CQI report method in accordance with the second or third embodiment is described below.

First, the base station (NodeB) determines a CQI report format (step S101). For example, the base station determines the number of sub-bands included in the system band (frequency resolution) or grouping information for grouping sub-bands (combination of sub-bands). The transmission interval for transmitting a frequency-selective CQI together with a CQI for the system band may be specified in the CQI report format. The CQI report format is transmitted to the user equipment terminal via downlink signaling or the like (step S103).

The user equipment terminal (UE) generates CQIs (a CQI absolute value and a CQI difference value) for the system band at the CQI transmission interval specified by the base station (step S105). In addition, the user equipment terminal (UE) generates a CQI for each sub-band when the CQI for each sub-band is to be reported (step S107). It should be noted that the user equipment terminal generates the CQIs for the system band and the CQI for each sub-band at the CQI transmission interval specified by the base station even when there are no downlink transmission data (not shown).

When downlink transmission data to be transmitted from the base station to the user equipment terminal are generated (step S109), the base station performs scheduling of the data (step S111) and transmits the data to the user equipment terminal (step S113). The user equipment terminal determines an error in the downlink transmission data (step S115) and multiplexes the determination result (ACK/NACK) and the CQI into the uplink control channel (step S117). The CQI multiplexed in this step is the CQI difference value. In addition, the CQI for each sub-band multiplexed in this step is set to a predetermined amount by reducing the amount of information for each sub-band or by grouping sub-bands. Then, the user equipment terminal transmits control information multiplexed into the uplink control channel (step S119). The uplink control information is separated by the base station. The acknowledge information is used to determine whether retransmission is needed and the CQIs for the system band and the CQI for each sub-band are used for scheduling (step S121).

Although the user equipment terminal reports to the base station CQIs for all the sub-bands included in the system band in the second and third embodiments, these embodiments are not limited to the report on the CQIs for all the sub-bands. These embodiments are also applicable to the report on CQIs for a predetermined number of sub-bands with better channel quality.

Fourth Embodiment

Example where a Frequency-Selective CQI is Reported in the Case of Plural System Bandwidths Next, a frequency-selective CQI report method is described below in the case where the mobile communication system supports plural system bandwidths. In a mobile communication system such as an LTE system, one base station can accommodate user equipment terminals with plural system bandwidths. For example, one base station can accommodate a user equipment terminal with the bandwidth of 1.4 MHz, a user equipment terminal with the bandwidth of 5 MHz, a user equipment terminal with the bandwidth of 10 MHz, and a user equipment terminal with the bandwidth of 20 MHz.

Assuming that Y bits are needed for a frequency-selective CQI in the case of the bandwidth of 5 MHz, 2Y bits are needed for a frequency-selective CQI in the case of the bandwidth of 10 MHz with the same frequency resolution. Similarly, 4Y bits are needed for a frequency-selective CQI in the case of the bandwidth of 20 MHz with the same frequency resolution. In this manner, the amount of information varies depending on the bandwidth. When a modulation scheme or a coding rate is controlled according to the variation in the amount of information, reception quality of the uplink control information may be degraded. Accordingly, it is necessary to keep constant the amount of information for the frequency-selective CQI to be reported at a single transmission timing regardless of the bandwidth.

With reference to FIG. 19, one example of a frequency-selective CQI report method in accordance with the fourth embodiment is described below. In the fourth embodiment, the base station increases the CQI transmission interval for the user equipment terminal with the bandwidth of 5 MHz and decreases the CQI transmission interval for the user equipment terminal with the bandwidth of 20 MHz. For example, the CQI transmission interval for the user equipment terminal with the bandwidth of 5 MHz is determined to be twice the CQI transmission interval for the user equipment terminal with the bandwidth of 10 MHz, and also determined to be four times the CQI transmission interval for the user equipment terminal with the bandwidth of 20 MHz. In this manner, the base station controls the CQI transmission interval depending on the bandwidth used by the user equipment terminal. Controlling the CQI transmission interval in this manner allows the amount of information needed for the frequency-selective CQI to be kept constant in each case.

In addition, as shown in FIG. 20(*a*), the user equipment terminal with the bandwidth of 20 MHz may divide the bandwidth of 20 MHz into equal four bandwidths (#1-#4) and report a CQI for the formed bandwidth of 5 MHz at a single transmission timing (localized scheme). Alternatively, as shown in FIG. 20(*b*), the user equipment terminal with the bandwidth of 20 MHz may divide the bandwidth of 20 MHz into equal sixteenth bandwidths and report a CQI for the bandwidths accounting for 5 MHz, which are selected from the sixteen bandwidths at even intervals (distributed scheme). By reporting the frequency-selective CQI by means of the distributed scheme, the base station can approximately grasp fluctuations in channel quality based on a CQI (for example #1) received at a single timing.

A user equipment terminal and a base station in accordance with the fourth embodiment include the same components as shown in FIGS. 15 and 17, respectively. For example, the sub-band basis CQI generating unit 113 in the user equipment terminal 10 generates a CQI for each sub-band at the interval according to the system bandwidth used by the user equipment terminal 10. In addition, the control information separating unit 201 in the base station 20 separates the CQI for each sub-band at the interval according to the system bandwidth used by the user equipment terminal 10.

According to an embodiment of the present invention, it is possible to maintain reception quality of channel quality information. Although the preferred embodiments of the present invention have been described, the present invention is not limited to these embodiments. Rather, the present invention can be changed or modified within the scope of the appended claims. For example, the present invention is not limited to the mobile communication system according to LTE, but may be applied to any mobile communication system in which channel quality information is transmitted on the uplink control channel.

The invention claimed is:

1. A user equipment terminal for reporting channel quality information to a base station, comprising:
a channel quality information measuring unit configured to measure channel quality information; and
a channel quality information generating unit configured to generate the channel quality information including a difference value between a first absolute value of the measured channel quality information and a second absolute value of channel quality information, the second absolute value being reported at a previous channel quality information transmission interval, and including a third absolute value representing the measured channel quality information with a smaller amount of information.

2. The user equipment terminal as claimed in claim 1, wherein:
the channel quality information generating unit periodically generates, as the channel quality information, the first absolute value.

3. The user equipment terminal as claimed in claim 1, further comprising:
a control information multiplexing unit configured to multiplex the difference value and acknowledge information into an uplink control channel, upon transmitting the acknowledge information in response to downlink transmission data from the base station.

4. The user equipment terminal as claimed in claim 1, wherein:
the channel quality information generating unit generates channel quality information for a system band, when the system band is divided into sub-bands and channel quality information is reported for each sub-band, and
the user equipment terminal further comprising:
a resource block basis channel quality information measuring unit configured to measure channel quality information for each resource block;
a sub-band basis channel quality information generating unit configured to generate channel quality information for each sub-band based on the measured channel quality information for each resource block; and
a control information multiplexing unit configured to multiplex the channel quality information for the system band and the channel quality information for each sub-band into an uplink control channel.

5. A user equipment terminal for reporting channel quality information to a base station, comprising:
a channel quality information measuring unit configured to measure channel quality information; and
a channel quality information generating unit configured to generate, as the channel quality information, a difference value between a first absolute value of the measured channel quality information and a second absolute value of previously measured channel quality information, wherein:
the channel quality information generating unit generates channel quality information for a system band, when the system band is divided into sub-bands and channel quality information is reported for each sub-band, and
the user equipment terminal further comprising:
a resource block basis channel quality information measuring unit configured to measure channel quality information for each resource block;
a sub-band basis channel quality information generating unit configured to generate channel quality information for each sub-band based on the measured channel quality information for each resource block; and
a control information multiplexing unit configured to multiplex the channel quality information for the system band and the channel quality information for each sub-band into an uplink control channel, wherein:

the sub-band basis channel quality information generating unit generates the channel quality information for each sub-band according to an amount of information determined based on the number of sub-bands included in the system band.

6. A user equipment terminal for reporting channel quality information to a base station, comprising:

a channel quality information measuring unit configured to measure channel quality information; and a channel quality information generating unit configured to generate, as the channel quality information, a difference value between a first absolute value of the measured channel quality information and a second absolute value of previously measured channel quality information, wherein:

the channel quality information generating unit generates channel quality information for a system band, when the system band is divided into sub-bands and channel quality information is reported for each sub-band, and the user equipment terminal further comprising:

a resource block basis channel quality information measuring unit configured to measure channel quality information for each resource block;

a sub-band basis channel quality information generating unit configured to generate channel quality information for each sub-band based on the measured channel quality information for each resource block; and a control information multiplexing unit configured to multiplex the channel quality information for the system band and the channel quality information for each sub-band into an uplink control channel, wherein:

the sub-band basis channel quality information generating unit groups the channel quality information for each sub-band according to a predetermined amount of information available for transmission and generates the grouped channel quality information for each sub-band.

7. A user equipment terminal for reporting channel quality information to a base station, comprising:

a channel quality information measuring unit configured to measure channel quality information; and a channel quality information generating unit configured to generate, as the channel quality information, a difference value between a first absolute value of the measured channel quality information and a second absolute value of previously measured channel quality information, wherein:

the channel quality information generating unit generates channel quality information for a system band, when the system band is divided into sub-bands and channel quality information is reported for each sub-band, and the user equipment terminal further comprising:

a resource block basis channel quality information measuring unit configured to measure channel quality information for each resource block;

a sub-band basis channel quality information generating unit configured to generate channel quality information for each sub-band based on the measured channel quality information for each resource block; and a control information multiplexing unit configured to multiplex the channel quality information for the system band and the channel quality information for each sub-band into an uplink control channel, wherein:

the sub-band basis channel quality information generating unit generates the channel quality information for each sub-band at a transmission interval according to a system bandwidth used by the user equipment terminal, when the base station supports plural system bandwidths.

8. A base station for receiving channel quality information from a user equipment terminal, comprising:

a control information receiving unit configured to receive the channel quality information including a difference value from an absolute value of channel quality information reported at a previous channel quality information transmission interval and a value representing channel quality information measured by the user equipment terminal with a smaller amount of information; and a channel quality information determining unit configured to determine whether an error occurs by comparing channel quality information determined based on an absolute value of previously determined channel quality information and the difference value with the value representing the channel quality information with the smaller amount of information and determine channel quality information based on the absolute value of the previously determined channel quality information and the difference value.

9. The base station as claimed in claim 8, wherein:

the channel quality information determining unit determines channel quality information for a system band, when the system band is divided into sub-bands and channel quality information is received for each sub-band, and the base station further comprising:

a band information transmitting unit configured to transmit information about the sub-bands included in the system band; and a sub-band basis channel quality information determining unit configured to determine channel quality information for each sub-band.

10. A channel quality information report method in which a user equipment terminal reports channel quality information to a base station, comprising the steps of:

measuring, by the user equipment terminal, channel quality information;

generating, by the user equipment terminal, the channel quality information including a difference value between a first absolute value of the measured channel quality information and a second absolute value of channel quality information, the second absolute value being reported at a previous channel quality information transmission interval, and including a third absolute value representing the measured channel quality information with a smaller amount of information;

receiving, by the base station, the channel quality information including the difference value and the third absolute value; and determining, by the base station, whether an error occurs by comparing channel quality information determined based on an absolute value of previously determined channel quality information and the difference value with the received third absolute value and determining channel quality information based on the absolute value of the previously determined channel quality information and the difference value.

* * * * *